United States Patent [19]

Corrigan

[11] 3,890,265

[45] June 17, 1975

[54] METHOD AND COMPOSITIONS FOR PROTECTING SURFACES

[75] Inventor: John Francis Corrigan, Pennant Hills, New South Wales, Australia

[73] Assignee: Enamel Varnish & Chemical Company of Australia Pty. Limited, Blacktown, New South Wales, Australia

[22] Filed: Sept. 7, 1972

[21] Appl. No.: 287,079

[52] U.S. Cl............. 260/33.6 UB; 117/71; 117/75; 260/33.4 UB; 260/42.22
[51] Int. Cl............................................ C08g 51/04
[58] Field of Search...... 260/32.6 NR, 77.5 SS, 77.5 AB, 260/37 N, 33.6 UB, 42.22

[56] References Cited
UNITED STATES PATENTS

| | | | |
|---|---|---|---|
| 2,692,873 | 10/1954 | Langerak | 260/77.5 AB |
| 2,692,874 | 10/1954 | Langerak | 260/77.5 AB |
| 3,196,026 | 7/1965 | Menard | 260/37 N |
| 3,446,771 | 5/1969 | Matsubayashi | 260/45.85 |
| 3,597,398 | 8/1971 | Davis | 260/32.6 NR |
| 3,658,762 | 4/1972 | Cobbledick | 260/77.5 AB |
| 3,726,827 | 4/1973 | Jones | 260/37 N |
| 3,746,692 | 7/1973 | Olstowski | 260/37 N |

*Primary Examiner*—Joseph L. Schofer
*Assistant Examiner*—P. R. Michl
*Attorney, Agent, or Firm*—Waters, Schwartz & Nissen

[57] ABSTRACT

A primer for protecting underwater metal surfaces comprises a moisture-curing polyurethane in a phosphoric acid base containing a dense pigment and a binder.

8 Claims, No Drawings

METHOD AND COMPOSITIONS FOR PROTECTING SURFACES

This invention relates to a method of protecting underwater metal surfaces and to compositions for use in such a method.

It is known that epoxide resins can be applied underwater in the form of a dense putty-like material. This material has the disadvantage that it has to be applied by hand.

One of the objects of the present invention is the provision of a protective composition which can be applied by a conventional painting appliance, for example, a roller.

This invention, therefore, provides a method of protecting underwater metal surfaces, wherein a composition, which comprises a moisture-curing polyurethane in a phosphoric acid-based primer containing a dense pigment and a binder, is applied to the metal surface.

It is preferred to apply a top-coat over the primer, wherein the top-coat comprises a moisture-curing polyurethane in a solvent-based anti-fouling composition containing an anti-fouling pigment and a binder.

It is further preferred to apply an under-coat between the primer and the top-coat, wherein the under-coat comprises a moisture-curing polyurethane in combination with a paste containing a pigment with high hiding power.

It will be readily recognized by those skilled in the art that it may be unnecessary to apply both the primer and the top-coat or all three coats to the metal surface, for example, it may be necessary only to retouch the anti-fouling top-coat. In other circumstances, for example, with static structures where fouling can be tolerated, it may be necessary only to apply the primer or the primer and the under-coat. Circumstances will dictate the combination used.

This invention further provides compositions for use in the methods described above.

PRIMER

The moisture-curing polyurethane, is, for example, prepared by reacting a polyether polyol, such as a propylene oxide adduct of trimethylolpropane with an average molecular weight of from 400 to 500, with an aromatic polyisocyanate, such as tolylene 2,4-diisocyanate. This material has an average of three "free" isocyanate groups per molecule. The same moisture-curing polyurethane can also be used in the under-coat and top-coat.

The phosphoric acid, i.e. orthophosphoric acid, used is preferably concentrated, for example, from 80 to 90% by weight.

The dense pigment is preferably a non-reactive metal with a high specific gravity, for example, lead, preferably flake lead.

The binder may be any suitable natural or man-made polymer which is not degraded by phosphoric acid and can suspend the dense pigment. It may be, for example, a polyvinyl acetal, for example, a solvent-soluble polyvinyl butyral.

In one embodiment of the primer according to the invention, the binder also comprises the moisture-curing polyurethane already mentioned. In this case the phosphoric acid used must be as concentrated as possible, since any water present will react with the free isocyanate groups or cause the phosphoric acid to dissociate and react with the isocyanate groups. 90% by weight phosphoric acid has been found to give an adequate pot-life, if the primer is prepared for use that day. The proportions of ingredients are as for binders such as polyvinyl butyral.

The primer preferably also comprises a solvent which is inexpensive, dissolves the binder and is compatible with the phosphoric acid, for example, industrial methylated spirits containing a small proportion of isopropylalcohol, or butanol.

Preferred proportions of ingredients are shown in Table I below:

| Ingredient | Range % by wt. |
| --- | --- |
| Phosphoric acid | 5 – 10 |
| Pigment | 55 – 75 |
| Binder | 25 – 40 |
| Solvent | 10 – 20 |

From 1 to 10 parts by volume of moisture-curing polyurethane is mixed with 1 part by volume of a mixture of the ingredients in Table 1, but preferably the ratio is substantially 2 to 1 part by volume.

UNDERCOAT

The pigment with high hiding power may be any of the pigments used in protective paints, for example, a chemical compound, such as red lead, calcium plumbate or zinc, lead, calcium, strontium or barium chromate, or a metal, such as zinc dust or aluminum, particularly leafing aluminum powder.

The solvent used to suspend the pigment must be compatible with the moisture-curing polyurethane, for example, a hydrocarbon solvent such as a kerosene fraction or a mixture of an aromatic and an aliphatic solvent, for example, in a proportion of about 4:1.

Preferred proportions of ingredients are shown in Table II below:

| Ingredient | Range % by wt. |
| --- | --- |
| Pigment | 10 – 15 |
| Moisture-curing polyurethane | 40 – 50 |
| Solvent | 10 – 50 |

TOP-COAT

The top-coat is preferably of the type described in the specification "United States Navy formula No. 121 for Anti-fouling Paint" which requires:

| Ingredient | % By wt. dry film |
| --- | --- |
| Cuprous oxide | 80.0 |
| Rosin | 8.0 |
| Vinyl resin | 8.0 |
| Tritolyl phosphate | 4.0 | which relates to a "contact leaching" and/or a "matrix soluble" type coating.

The pigment may be replaced by any other suitable material, such as mercuric oxide or the class of compounds known as the organic mercurials, or the organotins, but cuprous oxide is preferred.

The rosin may be replaced by any other natural resins, but is preferably rosin obtained from the Genus Pinus.

The vinyl resin is used to plasticize the rosin and is preferably a copolymer of vinyl chloride and vinyl acetate. However, chlorinated rubber may also be used.

The tritolyl (or tricresyl) phosphate is also used as a plasticizer and may be replaced by any other suitable plasticizer which is not leached easily from the film, such as dioctyl phthalate.

The solvent used must be compatible with the various polymeric materials used and may be any suitable hydrocarbon or oxygenated hydrocarbon, such as an aromatic fraction or a ketone ether.

Preferred proportions of ingredients are shown in Table III below:

| Ingredient | Range % by wt. |
|---|---|
| Anti-fouling pigment | 50 – 80 |
| Binder | 1 – 20 |
| Natural resin | 1 – 10 |
| Plasticizer | 0.1 – 5 |
| Solvent | 20 – 40 |

From 1 to 10 parts by volume of a mixture of the ingredients in Table III is mixed with 1 part by volume of moisture-curing polyurethane, but preferably the ratio is substantially 2 to 1 part by volume.

The following Example serves to illustrate the invention:

EXAMPLE

The following coats were applied to a steel surface which had been immersed for 100 days in salt water and then cleaned underwater using a wire brush. All coats were applied at a depth of 2 to 30 feet beneath the surface of the water using a paint roller.

i. Primer

The following composition was prepared by mixing:

| Ingredient | % by wt. |
|---|---|
| % wt. Flake lead in chlorinated hydrocarbon | 71.85 |
| Polyvinyl butyral of medium molecular weight containing low proportions of acetate and hydroxyl groups | 5.92 |
| Phosphoric acid (90% wt.) | 6.67 |
| Isopropyl alcohol | 2.22 |
| Industrial methylated spirits | 13.34 |

Three parts by volume of the above composition was mixed just prior to application with seven parts by volume of a moisture-curing polyurethane, containing approximately two to three isocyanate groups per molecule and prepared by reacting an aromatic diisocyanate with a polyether of medium molecular weight.

ii. Under-coat

This coat was prepared by mixing:

| Ingredient | Parts by volume |
|---|---|
| 60% wt. Flake aluminium in a kerosene fraction | 3 |
| Moisture-curing polyurethane described under (i) | 20 | iii. Top-coat

The following composition was prepared by mixing:

| Ingredient | % by weight |
|---|---|
| Cuprous oxide | 70.59 |
| Copolymer of vinyl Chloride (90% of monomer units) and vinyl acetate (10%) of medium molecular weight | 2.04 |
| Rosin ester | 4.34 |
| Tritolyl phosphate | 0.44 |
| 1,1-Dimethyl,1-methoxy-buttan-3-one | 15.05 |
| Commercial xylene | 7.54 |

Five parts by volume of the above composition were mixed just prior to application with two parts by volume of the moisture-curing polyurethane described under (i).

The three coats formed a coherent film on the steel surface. The steel surface was allowed to remain beneath the surface of the salt water for 300 days and was then examined. No fouling or corrosion was observed.

What I claim is:

1. A two-part primer composition adapted to be mixed immediately prior to use and applied to underwater metal surfaces for the protection thereof of which one part is a moisture-curing polyurethane and the second part is a suspension of a dense pigment which is a non-reactive metal with a high specific gravity in a mixture of a polyvinylbutyral binder, a solvent and phosphoric acid, said solvent being an organic solvent which dissolves the binder and is compatible with the phosphoric acid.

2. A primer composition according to claim 1 wherein the volume ratio of the polyurethane to the second part of the composition is about 1–10:1.

3. A primer composition according to claim 1 wherein the pigment is flake lead.

4. A primer composition according to claim 1 wherein the moisture-curing polyurethane is the reaction product of a polyether polyol with an aromatic polyisocyanate.

5. A primer composition according to claim 4 wherein the polyether polyol is a propylene oxide adduct of trimethylolpropane with an average molecular weight of from 400 to 500 and the aromatic polyisocyanate is tolylene 2,4-di-isocyanate.

6. A primer composition according to claim 1 wherein the phosphoric acid is from 80 to 90% by weight concentration.

7. A primer composition according to claim 5 wherein the pigment is flake lead.

8. A primer composition according to claim 2 wherein the ratio is about 2:1.

* * * * *